United States Patent [19]

Fife

[11] Patent Number: 4,942,777

[45] Date of Patent: Jul. 24, 1990

[54] DEVICE FOR CYCLICALLY VARYING THE PHASE RELATIONSHIP BETWEEN TWO ROTATING SHAFTS

[76] Inventor: Morton E. Fife, 3307 Kyle Ave. North, Golden Valley, Minn. 55422

[21] Appl. No.: 322,572

[22] Filed: Mar. 13, 1989

[51] Int. Cl.[5] ............................................. F16H 35/06
[52] U.S. Cl. ......................................... 74/397; 74/395
[58] Field of Search .......................... 74/397, 396, 395

[56] References Cited

U.S. PATENT DOCUMENTS

| | | |
|---|---|---|
| 1,358,186 | 11/1920 | Brewer . |
| 1,458,187 | 11/1920 | Brewer . |
| 1,622,491 | 3/1927 | Coatalen et al. . |
| 1,622,492 | 3/1927 | Coatalen et al. . |
| 3,397,589 | 8/1968 | Moore ................................. 74/397 |
| 3,426,610 | 2/1969 | Scharer ............................... 74/397 |
| 3,502,059 | 3/1970 | Davis et al. . |
| 3,734,073 | 5/1973 | Walter et al. ..................... 74/395 X |
| 3,888,217 | 6/1975 | Hisserich . |

FOREIGN PATENT DOCUMENTS 2553849 4/1985 France .................................. 74/397

Primary Examiner—Jose V. Chen
Attorney, Agent, or Firm—Haugen and Nikolai

[57] ABSTRACT

A drive linkage is provided between a drive shaft and a driven shaft, each being rotated on a fixed axis. The linkage includes a pair of intermediate gears between gears mounted concentrically on the drive and driven shafts, respectively, with links fixing the center-to-center distances of adjacent gears and maintaining neighboring gears in driving engagement. The linkage further includes a pair of control gears, a primary control gear being maintained in driving engagement with the drive gear through a pivotally mounted link, and a secondary control gear linked to the primary control gear and rotatably mounted to one of the intermediate gears through a pin near but offset from the centers of these gears. A selective positioning of the primary control gear causes an oscillation in the intermediate gear engaged with the driven gear, resulting in cyclical accelerations and decelerations in the driven gear responsive to a constant rotational speed in the drive gear. A preferred embodiment of this linkage is disclosed in connection with a four cycle internal combustion engine.

6 Claims, 2 Drawing Sheets

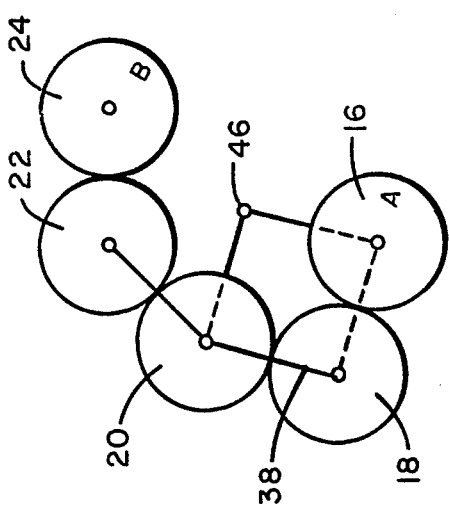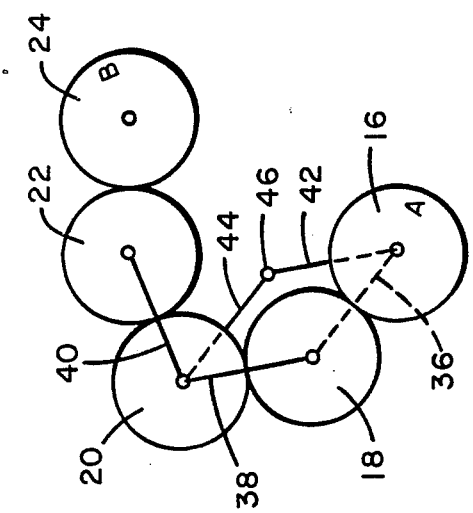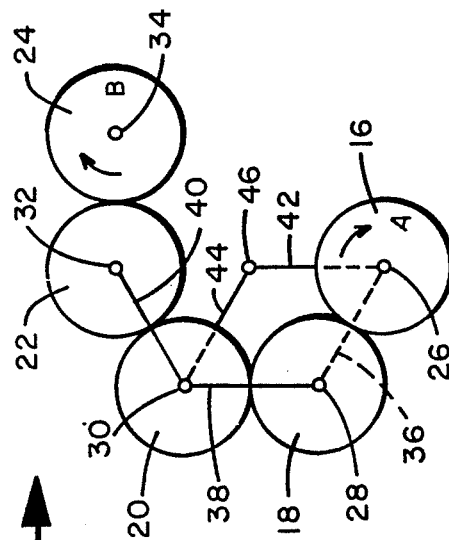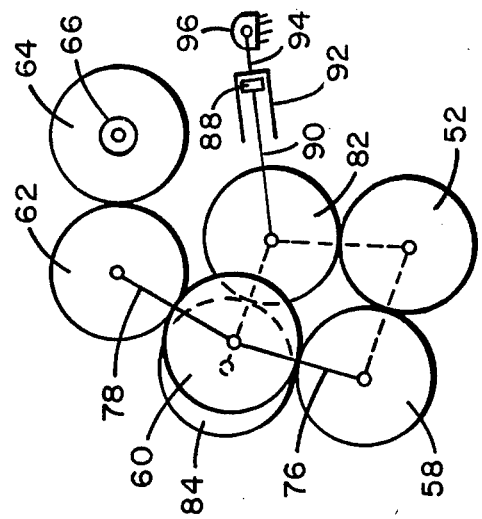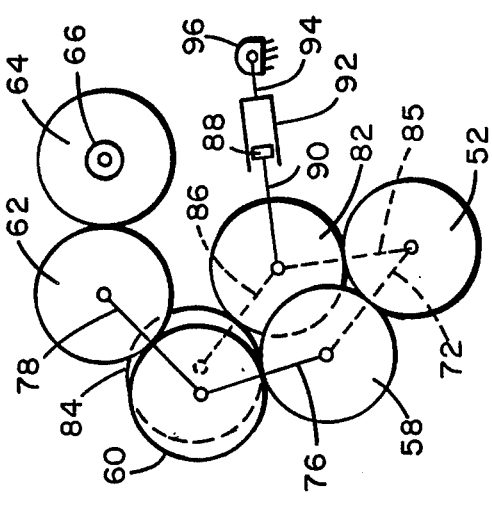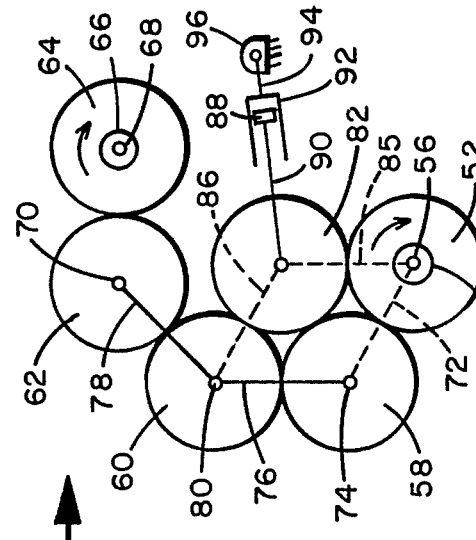

DEVICE FOR CYCLICALLY VARYING THE PHASE RELATIONSHIP BETWEEN TWO ROTATING SHAFTS

BACKGROUND OF THE INVENTION

This invention relates to linkages for drivably engaging a drive shaft and a driven shaft, and more particularly to a linkage for causing controlled, cyclical accelerations and decelerations in the driven shaft, responsive to rotating the drive shaft at a constant speed. A particular embodiment of the invention concerns drivingly engaging the crank shaft and cam shaft of an internal combustion engine to provide accelerations and decelerations in the cam shaft responsive to crank shaft rotation.

It is well known, in connection with conventional four stroke internal combustion engines, that optimal valve timing varies with the speed of the engine. More particularly, the duration over which each of the intake and exhaust valves is open, and the amount of overlap, or time during which both of the valves are open, ideally would vary with engine speed. Typically, however, the cam shaft and crank shaft are associated by a direct drive linkage which fixes cam shaft rotation at onehalf the rate of crank shaft speed. The duration for each valve, constant in terms of angular degrees, decreases in real time as the speed of the engine increases.

This gives rise to the need for a relatively long valve overlap at high engine rpm. In other words, the intake valve is opened before completion of the exhaust stroke and while the exhaust valve is still open, to provide sufficient time for the charge of air and fuel to reach the combustion chamber and enter the chamber as the downwardly traveling piston creates a lower pressure to draw in the charge. Likewise at high rpm, it is desirable and the typical practice for the exhaust valve to be opened before the end of the power stroke, well before bottom dead-center.

Conversely, at low engine rpm, particularly at idling speed, premature opening of the exhaust valve is not needed, and overlap of the intake and exhaust valves is undesirable, since it increases the probability that part of the fuel/air charge will be exhausted, and that some exhaust will be forced backward toward the carburetor, thus to reduce available torque, increase fuel consumption, and increase the undesirable products of combustion which contribute to air pollution. The conventional drive linkage fixes the angular values of duration and overlap, leading to a compromise setting of these values which is optimal neither for idle or high rpm.

Attempts to address this problem are found in the prior art. For example, U.S. Patent No. 1,622,491 (Coatalen et al) discloses a mechanism for varying the angular relationship of two shafts relative to a third shaft. In particular, epicyclic pinions r and s form part of a drive linkage that can vary the phase of a pump wheel t with respect to a driver 1. FIGS. 3, 4 and 4A show an epicentric linkage of wheels s (two parts) and r, which can be adjusted to vary the angular relation of either wheel p or wheels p and o relative to driver 1. This approach can not affect duration, but does change the phase relationship. In U.S. Pat. No. 1,358,187 (Brewer), a timing mechanism is disclosed in which operation of the exhaust valve in relation to the inlet valve is altered by a gear train which changes the peripheral position of the exhaust valve shaft in relation to the crank shaft.

U. S. Patent No. 3,888,217 (Hisserich) shows a cam shaft belt drive for variable valve timing, in which slack in a timing belt is taken up by a pair of idler pulleys. The idler pulleys can be displaced to change the angular relation of the drive pulley on the crank shaft relative to a driven pulley on the cam shaft. Separate cam shafts can be provided for the intake and exhaust valve lobes, respectively, in which event the amount of valve overlap can be controlled.

U. S. Pat. No. 3,502,059 (Davis et al) discloses an adjustable gear train in which connector brackets 76 and 78 fix the center-to-center distance between respective pairs of idler gears and idler drive gears, positioned between the crank shafts and a pair of cam shafts. Each bracket is movable to adjust the lash between its associated idler gear and a driven gear mounted on its respective cam shaft.

In an article entitled "Eccentric Cam Drive Varies Valve Timing" (*Automotive Engineering*, Vol. 88, No. 10, Oct. 1980), a valve timing system is disclosed based on eccentric displacement of a drive sprocket relative to a single overhead cam shaft. The drive sprocket is mounted in a transverse slide which is moved against the force of a tensioning spring, to progressively decrease eccentricity as speed increases. The result is to retard inlet valve openings, advance inlet valve closing, and retard exhaust valve opening. Finally, in an article entitled "Valve Timing With Variable Overlap Control" by Stojek and Stwlorok, separate cam shafts are provided for the inlet and exhaust valves. A helical central gear, driven by the crank shaft through a roller supported chain, cooperates with two helical cam shaft gears to selectively angularly position the cam shaft drive gears with respect to each other. The gears are moved by toothed sleeves, which in turn are driven by microprocessor controlled electric motors, thus enabling a variable valve overlap.

While the above systems in general have demonstrated the possibility of selectively varying valve overlap and, to a limited extent, valve duration, they do not adequately address the need to respond to wide ranging changes in engine rpm.

Therefore, it is an object of the present invention to provide, in an internal combustion engine, a linkage for drivably engaging a cam shaft with a crank shaft in a manner to cyclically accelerate and decelerate the cam shaft responsive to rotating the crank shaft at a constant velocity.

Another object is to provide a means for countering the increase in real time of valve overlap as the rpm of an internal combustion engine decreases.

Another object is to provide optimal intake and exhaust valve timing over a wider range of engine rpm in order to enhance power and fuel economy while reducing engine emissions.

In a broader sense, an object of the invention is to provide a relatively simple means for selectively and cyclically accelerating and decelerating a driven shaft in response to rotating a drive shaft at a constant velocity.

SUMMARY OF THE INVENTION

To achieve these and other objects, there is provided an apparatus for effecting cyclical accelerations and decelerations in a driven shaft in response to rotating a drive shaft at a constant velocity. The apparatus includes a drive shaft and a means for rotating the drive shaft about a fixed longitudinal drive axis, and a drive gear mounted concentrically on the drive shaft for rotation with the drive shaft. The apparatus further includes a driven shaft rotatable on a longitudinal driven shaft axis fixed relative to the drive axis, and a driven gear mounted concentrically on the driven shaft for rotation therewith. A drive linkage means drivably engages the drive gear and driven gear, and includes a first intermediate gear rotatable about a longitudinal first axis. A first connecting means is rotatably mounted to the drive gear and the first intermediate gear, for maintaining the drive gear and first gear in driving engagement while maintaining a fixed distance between the drive gear axis and first axis. A second intermediate gear is rotated about a longitudinal second axis, and a second connecting means is rotatably mounted to the first and second intermediate gears, for maintaining these gears in driving engagement while maintaining a fixed distance between their axes. A third connecting means is rotatably mounted to the second gear and the driven gear, for maintaining the second gear and driven gear in driving engagement while maintaining a fixed distance between their respective axes.

Finally, a moving means is provided for controllably and transversely moving one of the first and second intermediate gears during rotation of the drive gear. Such movement transversely reciprocates the first and second axes, thereby dynamically altering the phase relationship between the drive gear and driven gear.

The moving means can include a longitudinally extended cylindrical pin mounted to the second intermediate gear at a location spaced transversely apart from the second axis a first select distance, along with a means for controllably moving the axle transversely to reciprocate the second gear and second axis.

A preferred form of moving means includes intermediate third and fourth gears. The third gear rotates on a longitudinal third axis and the fourth gear rotates on a longitudinal fourth axis. A fourth connecting means is rotatably mounted to the third gear and drive gear for maintaining these gears drivably engaged and maintaining a fixed distance between their centers. Similarly, a fifth connecting means maintains the third and fourth gears in driving engagement while maintaining a fixed transverse distance between the third and fourth axes. The pin mounted to the second intermediate gear also is mounted to the fourth intermediate gear, thereby rotatably mounting the second and fourth intermediate gears with respect to one another.

The pin advantageously is mounted to the fourth gear in the same manner as to the second gear, i.e. a selected transverse distance from the axis of the gear. When the selected transverse distances for the second and fourth gears are equal, a selected movement of the third intermediate gear can position the fourth gear concentrically with the second gear, in which event rotation of the drive shaft at a constant speed rotates the driven shaft at a constant speed. Movement of the third intermediate gear away from such aligning position causes accelerations and decelerations in the driven shaft, as the drive shaft rotational velocity remains constant.

One specific application of this apparatus is in the driving association of the crank shaft and cam shaft of a four cycle internal combustion engine. In particular, the third intermediate or "control" gear can be located in its aligning position corresponding to a selected maximum operating engine rpm. At this level, the cam shaft operates at a constant velocity typically one-half that of the crank shaft angular speed. With a decrease in engine rpm, the control gear is moved in an arcuate path about the drive axis, progressively away from the alignment position. Moreover, the intermediate gears are arranged such that the fully accelerated or highest angular velocity segment of driven shaft (cam shaft) rotation coincides with the valve overlap condition. Accordingly, the overlap in real time need not steadily decrease as engine rpm increases.

As a consequence of this arrangement, a relatively large overlap at high rpm is available to overcome inertia effects of the exhaust and fuel/air charge, resulting in higher performance. At the same time, a relatively smaller overlap at lower engine rpm can reduce the necessary engine idling speed, reduce fuel consumption at lower speeds including idling speed, improve low and mid-range speed torque, and reduce undesirable engine emissions.

IN THE DRAWINGS

For a further appreciation of the above and other features and advantages, reference is made to the following detailed description and drawings, in which:

FIG. 1 is a schematic illustration of a simple gear train illustrating involved in the present invention;

FIGS. 2 and 3 illustrate the gear train of FIG. 1 in different operating positions;

Figure 8:
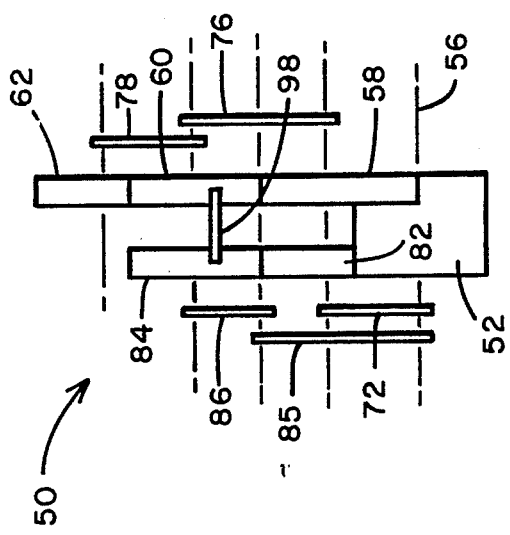
Figure 10:
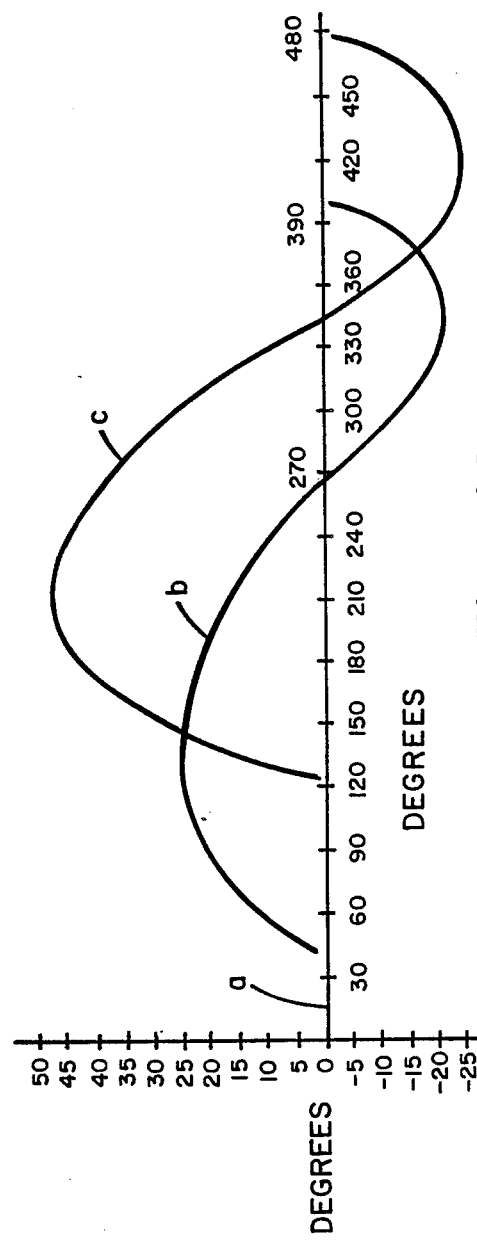
Figure 9:
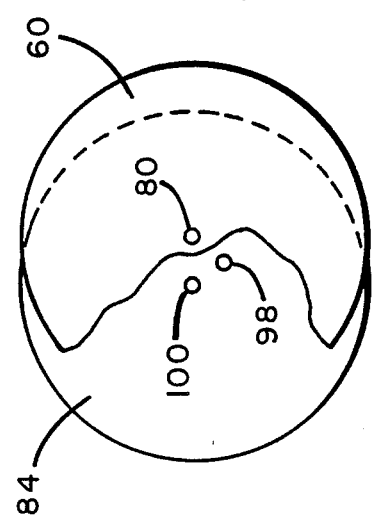

FIG. 5 schematic view of a gear train constructed in accordance with the present invention and used to drivingly engage a crank shaft and cam shaft of a four cycle internal combustion engine;

FIGS. 6 and 7 illustrate the gear train of FIG. 5 in different operating positions;

FIG. 8 is a side elevation of the gear train of FIG. 5 disassembled to show its separate parts;

FIG. 9 is a schematic view showing two intermediate gears of the gear of FIG. 5; and FIG. 10 is a graph illustrating angular positions of a driven gear of the drive train corresponding to selected angular positions of a drive gear of the gear train, for alternative control gear positions.

DETAILED DESCRIPTION OF THE PREFERRED EMBODIMENT

Turning now to the drawings, there is shown in FIG. 1 a drive train including a drive gear 16, a first intermediate gear 18, a second intermediate gear 20, a first driven gear 22, and a second driven gear 24, rotatable respectively about central axes 26, 28, 30, 32 and 34, all of which appear as points in the figure and can be conveniently considered as longitudinal axes. An elongate, substantially rigid first link or rod 36 is rotatably mounted at its opposite ends to the centers of drive gear 16 and intermediate gear 18, respectively, thus to maintain these gears drivably engaged with one another while maintaining a fixed distance between axes 26 and 28. A second rod or link 38 is similarly mounted to and similarly maintains intermediate gears 18 and 20 drivably engaged. A third intermediate link or rod 40 likewise is mounted to and maintains intermediate gear 20 and driven gear 22 drivably engaged. The axes of drive gear 16, driven gear 22 and driven gear 24 are fixed.

Gears 16-24 are all the same size. Accordingly, rotation of drive gear 16 at a selected angular velocity causes rotation of each of the other gears at this same velocity, and in a direction for each gear as indicated by its associated arrow.

As illustrated in FIG. 1, drive gear 16 and driven gear 24 are in phase. In particular, a position A along the perimeter of drive gear 16 and a position B along the perimeter of driven gear 24 are both at a "three o'clock" position and remain aligned with one another as gears 16 and 24 rotate in concert.

A fourth link 42 and a fifth link 44 are rotatably mounted to the center of drive gear 16 and intermediate gear 20, respectively, and are pivotally joined at their opposite ends at a control junction 46. The in-phase condition of the drive and driven gears is maintained so long as control junction 46 is located as shown in FIG. 1.

Moving control junction 46 to the position illustrated in FIG. 2 narrows the parallelogram formed by links 36, 38, 42 and 44, to increase the distance between drive gear 16 and intermediate gear 20, thus to rotate driven gear 24 counterclockwise relative to rotation of drive gear 16. As indicated by the relative locations of positions A and B, driven gear 24 no longer is in the same phase relationship with the drive gear, having been retarded or rotated counterclockwise with respect to the drive gear.

Conversely, movement of control junction 46 in the opposite direction widens the parallelogram formed by rods 36, 38, 42 and 44 to reduce the distance between drive gear 16 and intermediate gear 20. This rotates driven gear 24 clockwise, i.e. advances the gear, in relation to rotation of drive gear 16. Driven gear 24 is provided in addition to driven gear 22 in order to more clearly illustrate these changes in phase relationship, as gear 24, like drive gear 16, rotates clockwise. Gear 22 of course experiences similar changes.

Figure 4:
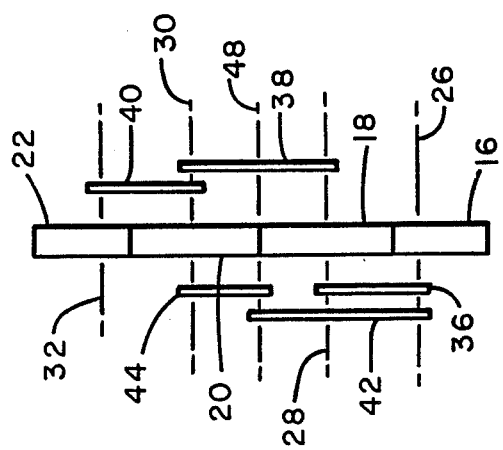
FIG. 4 is a side elevation of the gear train of FIG. 1 disassembled to show its separate parts.

It is to be appreciated that the phase relationship of the drive and driven gears ca be achieved through direct movement of either intermediate gear 18 or intermediate gear 20 as well as through direct movement of control junction 46. Also, the gears need not be of the same size, in which event driven gear 24 may rotate at a select multiple or fraction of the drive gear speed. In either event, the phase relationship is controlled by controlling the distance between axes 26 and 30 of gears 16 and 20, respectively. FIG. 4 illustrates the gears and their respective axes, as well as an axis 48 of control junction 46.

As driven gear 24 is advanced relative to the drive gear 16, its velocity (and that of driven gear 22) is momentarily greater than the drive gear velocity. Conversely, the driven gears travel at a relatively slower angular speed as position B is shifted in the counterclockwise direction with respect to position A. Accordingly, periodic or cyclical increases and decreases in the separation of axes 26 and 30 result in corresponding cyclical accelerations and decelerations of driven gear 24 in response to rotating drive gear 16 at a constant velocity.

FIGS. 5-8 illustrate a gear train arranged to provide a selected oscillation of an intermediate gear with respect to a drive gear in connection with the operation of a four stroke internal combustion engine. The majority of the engine structure is not illustrated as it is known and not considered particularly germane to the present invention.

Turning to FIG. 5, a drive gear 52 is mounted concentrically on a crank shaft 54 for clockwise rotation therewith about a drive axis 56. A first intermediate gear 58, a second intermediate gear 60 and a driven gear 62, along with a cam shaft gear 64, form a drive train which engages the crank shaft and a cam shaft 66. Cam shaft gear 64 is mounted concentrically on the cam shaft for rotation therewith about a cam shaft axis 68. The cam shaft axis, a driven axis 70 of driven gear 62, and drive axis 56 all are fixed relative to the block of the internal combustion engine. Gear 64, like previously described gear 24, is not essential (gear 62 would suffice) yet useful in visualizing the phase relationship with drive gear 52.

An elongate first link or rod 72 is rotatably mounted at its opposite ends to the centers of drive gear 52 and intermediate gear 58, respectively, thus to maintain these gears in a driving engagement and fix the distance between drive axis 56 and an axis 74 of intermediate gear 58. In similar fashion, an elongate second link 76 is mounted to intermediate gears 58 and 60, and an elongate third link 78 is similarly mounted to gears 60 and 62. Thus, axes 74 of gear 58 and 80 of gear 60 are not fixed relative to the engine, to permit a controlled variance of the distance between axis 60 and drive axis 56.

A second gear train associated with drive gear 52 includes a control gear 82 and an oscillator gear 84 (FIG. 8) axially aligned and behind gear 60 as viewed in FIG. 5. A first control link 8 is rotatably mounted at its opposite ends to the centers of drive gear 52 and control gear 82, respectively, to maintain these gears in a driving engagement and fix the distance between their respective centers. Likewise, a second control link 86 is rotatably mounted to control the gear 82 and gear 84 to similarly maintain these gears. As seen from FIGS. 6, 7 and 8, control gear 82 is not drivably engaged with either of intermediate gears 58 and 60.

Control gear 82, due to control link 84, not only rotates but is movable in an arcuate path about drive gear 52, thus to controllably alter the shape of the parallelogram formed by links 72, 76, 85 and 86 and thereby control the linear distance between drive axis 56 and axis 80 of intermediate gear 60. To this end, there is shown schematically a piston 88 at one end of a rod 90, the other end of which is rotatably mounted to control gear 82 at its center. Piston 88 is reciprocable within a cylinder 92, and a bar 94 fixed to the cylinder is pivotally connected to the engine block or other point integral with the engine block as indicated at 96.

Thus, extension and retraction of piston 88 within cylinder 92, by means well known and accordingly not illustrated, move control gear 82 along its arcuate path. It is to be recognized that alternative means can be employed to controllably position gear 82, for example a cam and cam follower, worm gear arrangement, rack and pinion, or the like. For an example of one approach, reference is made to U. S. Patent No. 3,888,217 (Hisserich).

As seen in FIG. 8, drive gear 52 has an axial dimension well over twice that of the remaining gears in order to permit a longitudinal or axial separation of the gear train formed by gears 52, 58, 60 and 62, and the control gear train including gears 82 and 84. Accordingly, piston 88 and rod 90 may be extended as shown in FIG. 6, whereby control gear 82 passes behind intermediate gear 58 as viewed in the figure, thus to increase the separation between drive axis 56 and axis 80. Alternatively, the piston and cylinder may be retracted to shorten the distance between these axes, as indicated in FIG. 7. It is to be recognized that while rod 90 is connected to control gear 82, the linkage could, as well, be operated through a direct connection to one of the other gears, for example intermediate gear 58.

Returning to FIG. 8, an elongate longitudinally directed cylindrical pin 98 is connected to intermediate gear 60 and gear 84 in a manner to allow rotation of these gears relative to one another. For example, pin 98 is rotatably mounted to both of these gears, although alternatively the pin can be fixed to one of the gears and rotatably mounted to the other. As seen in FIG. 9, pin 98 is mounted to each of gears 60 and 84 at a location transversely offset from the center of each gear, and by the same amount. The transverse offset of pin 98 from axes 80 and 100 of gears 60 and 84, respectively, is illustrated in FIG. 9.

Because the transverse offset is the same in both cases, gear 84, by means of control gear 82, can be moved into an axial or concentric alignment with gear 60 as indicated in FIG. 5. In this axially aligned position, the phase relationship of drive gear 52 and cam shaft gear 64 remains constant, and thus the driven gear experiences no accelerations or decelerations, so long as the velocity of the drive gear remains constant.

Moving control gear 82 to reposition gear 84 creates a cyclical motion of intermediate gear 60 which can be separated into three principal components: (1) the rotation of intermediate gear 60 about axis 80; (2) the revolution of intermediate gear 60 about pin 98 in a circular path having a radius equal to the transverse offset; and (3) the travel of pin 98 in a circular path due to rotation of gear 84 in a circular path with a radius equal to the transverse offset. Consequently, given a transverse offset of one-quarter inch for example, the positioning of gear 82 to align axes 80 and 100 on opposite sides of pin 98 yields a maximum offset of one-half inch.

The maximum offset, and to a lesser extent any configuration in which gears 60 and 84 are non-concentric, results in cyclical or oscillatory motion of intermediate gear 60, generally as described above. However, the exact path of travel for intermediate gear 60 also is determined by link 78, which limits travel of intermediate gear 60 to an arcuate path about the center of driven gear 62. Generally, during one part of each cycle the travel of intermediate gear 60 relative to gear 62 is additive, for an increase in the rotational velocity of driven gear 62. During another part of the cycle, the travel of gear 60 relative to gear 62 is in the opposite direction, resulting in decreased rotational velocity of the driven gear. Accordingly, driven gear 62 experiences periodic accelerations and decelerations in response to rotating the drive gear at a constant velocity.

Preferably piston 90 and cylinder 92 are operated to selectively position control gear 82 based upon engine speed (rpm), and further are adjusted so that control gear 82 positions oscillator gear 84 in the aligned position relative to intermediate gear 60 (FIG. 5), when engine rpm is at a selected maximum value. Further, rotation of cam shaft gear 64 is in a selected phase relationship with gear 52, such that for a non-concentric positioning of gears 60 and 84, the accelerated or higher velocity portion of cam shaft gear and driven gear rotation coincides with valve overlap, i.e. the time during which cam lobes of the cam shaft are biasing both the intake valve and the exhaust valve into the open condition. Finally, the piston and cylinder are operated to increase the offset of gears 60 and 84 as engine speed decreases, toward a maximum offset coincident with idling speed.

It is to be recognized that the embodiment of FIGS. 5-9 is disclosed as a simplified version in which all gears have the same diameter. It is considered within the skill of the art to modify the embodiment, for example to provide for the customary rotation of cam shaft 66 at half the velocity of crank shaft 54, and further to provide multiple phase changes, or alternating accelerations and decelerations, in a single rotation of crank shaft 54, or to provide separate drive trains for timing separate exhaust and intake cam shafts, or even multiple cylinders, all based on a single crank shaft.

In connection with the preferred embodiment, the following tables illustrate the sequential angular positioning of cam shaft gear 64 as drive gear 52 is advanced sequentially by equal amounts, in this case, 10°. The shift of gear 82, alone, changes the phase relation of gears 52 and 64, as noted in the initial displacement (43°/122°) listed for each table.

TABLE I

| INITIAL DISPLACEMENT 43° | | |
|---|---|---|
| Drive Gear | Driven Gear | Advance (+) or Retard (−) |
| 0 | 0 | 0° |
| 10 | 16 | +6° |
| 20 | 32 | +12° |
| 30 | 46 | +16° |
| 40 | 58 | +18° |
| 50 | 71 | +21° |
| 60 | 83 | +23° |
| 70 | 94 | +24° |
| 80 | 105 | +25° |
| 90 | 115 | +25° |
| 100 | 125 | +25° |
| 110 | 134 | +24° |
| 120 | 142 | +22° |
| 130 | 151 | +21° |
| 140 | 160 | +20° |
| 150 | 168 | +16° |
| 160 | 176 | +16° |
| 170 | 184 | +14° |
| 180 | 192 | +12° |
| 190 | 199 | +9° |
| 200 | 206 | +6° |
| 210 | 213 | +3° |
| 220 | 219 | −1° |
| 230 | 226 | −4° |
| 240 | 231 | −9° |
| 250 | 238 | −12° |
| 260 | 245 | −15° |
| 270 | 252 | −18° |
| 280 | 259 | −21° |
| 290 | 267 | −23° |
| 300 | 277 | −23° |
| 310 | 287 | −23° |
| 320 | 299 | −21° |
| 330 | 313 | −17° |
| 340 | 327 | −13° |
| 350 | 343 | −7° |
| 360 | 360 | 0° |

TABLE II

| 122° ADVANCE | | |
|---|---|---|
| Drive Gear | Driven Gear | Advance (+) or Retard (−) |
| 0 | 0 | 0° |
| 10 | 18 | +8° |
| 20 | 37 | +17° |
| 30 | 55 | +25° |
| 40 | 72 | +32° |
| 50 | 88 | +38° |
| 60 | 102 | +42° |
| 70 | 114 | +44° |
| 80 | 126 | +46° |
| 90 | 137 | +47° |
| 100 | 146 | +46° |
| 110 | 155 | +45° |
| 120 | 163 | +43° |
| 130 | 170 | +40° |
| 140 | 176 | +36° |

TABLE II-continued

122° ADVANCE

| Drive Gear | Driven Gear | Advance (+) or Retard (−) |
|---|---|---|
| 150 | 184 | +34° |
| 160 | 190 | +30° |
| 170 | 195 | +25° |
| 180 | 200 | +20° |
| 190 | 204 | +14° |
| 200 | 210 | +10° |
| 210 | 214 | +4° |
| 220 | 219 | −1° |
| 230 | 224 | −6° |
| 240 | 229 | −11° |
| 250 | 233 | −17° |
| 260 | 240 | −20° |
| 270 | 247 | −23° |
| 280 | 256 | −24° |
| 290 | 264 | −26° |
| 300 | 273 | −27° |
| 310 | 285 | −25° |
| 320 | 298 | −22° |
| 330 | 312 | −18° |
| 340 | 327 | −13° |
| 350 | 344 | −6° |
| 360 | 360 | 0° |

To counteract the initial displacement (43° and 122° in connection with Tables I and II, respectively, the linkage shown in FIGS. 5–8 may be slightly modified, to interpose a pair of linking gears (not shown) between drive gear 52 and control gear 82. The two linking gears (not shown) would be drivingly engaged with one another, with each of the gears in turn engaged with one of gears 52 and 82. Preferably these linking gears would be small in size relative to gears 52 and 82, for example one-tenth of the diameter of the drive and control gears. The linking gears can be translated in a known manner to change the phase relationship between gears 82 and 52, thus to counteract the displacement.

In the graph of FIG. 10, the X axis corresponds to drive gear position (advanced or retarded) and the Y axis corresponds to driven gear position relative to drive gear position. A straight line on the X axis represents the alignment condition shown in FIG. 5 (no advance or retard), with curves b and c corresponding to the separate offsets of gears 60 and 84 in Tables I and II respectively, and further showing the initial displacement in each case. As seen from the graph, curves b and c each include an advance portion of the cycle in which the driven gear and cam shaft gear displacements are greater than those of the drive gear, along with a retard portion in which these displacements are less than those of the drive gear.

Typically in a four cycle internal combustion engine, the intake valve is opened near the end of the exhaust cycle, for example 14° before top dead center, while the exhaust valve is not allowed to close until after the intake stroke has begun, for example 20° after top dead center. In accordance with the present invention, these angular values could remain the same. However, with the higher speed or accelerated cycle portion of gears 62 and 64 coinciding with valve overlap, the real time increase in duration, and in valve overlap which would occur at reduced rpm if gears 62 and 64 remained in phase with drive gear 52, is substantially mitigated. Thus, as compared to conventional drive linkages between the crank shaft and cam shaft, relatively shorter durations and relatively shorter overlap are provided at lower engine rpm, to increase fuel economy, provide better torque, and reduce the engine emissions which contribute to air pollution. Yet the present invention also allows a relatively longer overlap at higher engine speeds to overcome the inertia of the exhaust gases and the fuel/air charge, for more efficient operation at higher speeds.

The present invention is advantageously employed in connection with two independent cam shafts, concentric or otherwise, with one of the shafts supporting the intake valve cams and the other supporting the exhaust valve cams. In this approach, the cyclical accelerations and decelerations provided through the invention are augmented by properly timed changes in the phase relationship of the independent cams, to more closely approach ideal valve durations and valve overlap times corresponding to various engine speeds. Moreover, such changes in phase in the independent cam shafts can be set to counteract the aforementioned initial displacements discussed in connection with Tables I and II.

What is claimed is:

1. Apparatus for effecting cyclical accelerations and decelerations in a driven shaft in response to rotating a drive shaft at a constant velocity, including:

a drive shaft and a means for rotating the drive shaft about a fixed longitudinal drive axis, and a drive gear mounted concentrically on said drive shaft for rotation with said drive shaft;

a driven shaft rotatable on a longitudinal driven shaft fixed relative to said drive axis, and a driven gear mounted concentrically on said driven shaft for rotation with said shaft; and a drive linkage means for drivably engaging said drive gear and said driven gear, and including:

a first intermediate gear rotatable about a longitudinal first axis, and a first connecting means rotatably mounted to said drive gear and said first intermediate gear, for maintaining said drive gear and first gear in driving engagement while maintaining a fixed distance between the drive axis and the first axis;

a second intermediate gear rotatable about a longitudinal second axis, and a second connecting means rotatably mounted to said first gear and said second gear for maintaining said first gear and said second gear in driving engagement while maintaining a fixed distance between said first and second axes;

a third connecting means rotatably connected to said second gear and said driven gear, for maintaining said second gear and driven gear in driving engagement while maintaining a fixed distance between said second axis and said driven shaft axis; and a moving means including a transversely reciprocable element connected to an associated one of said first and second intermediate gears for controllably and transversely reciprocating said associated gear while said drive gear rotates, to transversely reciprocate said first and second intermediate gears and their associated axes, and thereby dynamically alter a phase relationship between said drive gear and said driven gear.

2. The apparatus of claim 1 wherein:

said element includes an elongate, longitudinally extended cylindrical pin rotatably mounted to said second intermediate gear at a location spaced apart transversely of said second axis a first selected distance, and said moving means includes a means for controllably and transversely moving said pin to reciprocate said second gear and second axis.

3. The apparatus of claim 2 wherein:

said moving means includes a third intermediate gear rotatable about a longitudinal third axis, and a fourth connecting means rotatably mounted to said third intermediate gear and to said drive gear for maintaining said third intermediate gear and drive gear in driving engagement while maintaining a fixed distance between said third axis and drive axis;

a fourth intermediate gear rotatable about a longitudinal fourth axis, and a fifth connecting means rotatably mounted to said third and fourth intermediate gears for maintaining said third and fourth gears in driving engagement while maintaining a fixed transverse distance between said third and fourth axes; and a means mounting said pin to said fourth intermediate gear, thereby mounting said fourth gear rotatably with respect to said second intermediate gear.

4. The apparatus of claim 3 wherein:

said pin is mounted to said fourth intermediate gear at a selected location transversely spaced apart from said fourth axis at a second selected distance.

5. The apparatus of claim 4 wherein:

said moving means further include a means for controllably moving said third intermediate gear to selectively position said third axis along an arcuate path about said drive axis.

6. The apparatus of claim 5 wherein:

said first, second, third and fourth intermediate gears are all of the same diameter, and wherein said first and second selected distances are the same.

* * * * *